United States Patent
Marsh et al.

[15] 3,655,557

[45] Apr. 11, 1972

[54] DETERGENT ADDITIVES

[72] Inventors: John F. Marsh, Oxford; Joseph M. Swietlik, Reading, both of England

[73] Assignee: Esso Research and Engineering Company

[22] Filed: Sept. 4, 1969

[21] Appl. No.: 855,378

[30] Foreign Application Priority Data

Sept. 11, 1968  Great Britain......................43,253/68

[52] U.S. Cl...........................252/32.7 HC, 44/51, 252/33.2, 252/37.7, 252/39, 252/42.7
[51] Int. Cl. .....................................................C10m 1/46
[58] Field of Search..................252/39, 37.7, 32.7 HC, 33.2, 252/42.7; 44/51

[56] References Cited

UNITED STATES PATENTS

| | | | |
|---|---|---|---|
| 2,805,233 | 9/1957 | Bell | 252/36 |
| 2,723,235 | 11/1955 | Asseff et al. | 252/33.2 |
| 3,021,280 | 2/1962 | Carlyle | 252/33 |
| 3,424,679 | 1/1969 | Allphin | 252/21 |

*Primary Examiner*—Daniel E. Wyman
*Assistant Examiner*—I. Vaughn
*Attorney*—Pearlman and Stahl and Frank T. Johmann

[57] ABSTRACT

Detergent additives for lubricating oils which are highly basic are prepared by reacting a carboxylic acid (e.g. formic acid) with a metal alcoholate in the presence of a surfactant (e.g. a sulphonate) dissolved in an oil.

14 Claims, No Drawings

DETERGENT ADDITIVES

The invention relates to compounds which serve as detergent additives, especially in lubricating oils.

According to this invention compounds suitable as detergent additives are the reaction products obtained by reacting a metal alcoholate with a carboxylic acid in the presence of a surfactant dissolved in a diluent, e.g. an oil.

The metals from which the alcoholates are derived are preferably those of Groups I, II or III of the Periodic Table. Thus, alkali metal alcoholates, e.g. those of sodium or potassium, alkaline earth metal alcoholates, e.g. those of calcium, or barium, or aluminum alcoholates may be used. Other suitable alcoholates include for example those of copper, iron or cobalt. In general alcoholates of polyvalent metals are preferred.

The alcoholates are preferably derived from monohydric alcohols although if desired they may be derived from glycols, or other polyols provided the alcoholate thus obtained is soluble in the glycol or polyol. Of the monohydric alcohols, primary alcohols are preferred especially branched chain, although secondary or tertiary alcohols may be used. Thus, particularly suitable alcohols are primary monohydric alcohols containing less than eight carbon atoms per molecule, e.g. methanol, ethanol, isopropanol, isobutanol, isopentanol, or hexanol. Also a particularly suitable class of alcohols are the alkoxy alkanols, e.g. those containing less than eight carbon atoms per molecules, e.g. methoxyethanol, or ethoxyethanol. Halogen containing alcohols may also be used, as may also aromatic alcohols.

In order to prepare the alcoholate it is necessary to react the alcohol with the metal, its hydride or its carbide. In general it is only practical to react metals of Groups Ia and IIa of the Periodic Table with an alcohol, and so for the other alcoholates the alcohol should be reacted with the carbide or hydride of the metal. When reacting a carbide or hydride of a metal with an alcohol it is found that the most suitable type of alcohol is an alkyoxyalkanol, especially methoxyethanol or ethoxyethanol.

A suitable method of preparing the alcoholate is to reflux for some period of time (e.g. 12–24 hours) the alcohol with the metal, (e.g. as turnings) or its hydride or carbide.

Alcoholates which are otherwise difficult to obtain may be prepared by double decomposition, e.g. from sodium alcoholate i.e. $n\text{NaOR} + \text{MX}_n \rightarrow \text{M(OR)}_n + n\text{NaX}$ where M is the metal and X a halogen atom.

The most suitable carboxylic acids are mono- and dicarboxylic acids especially those containing not more than four carbon atoms per molecule. Thus, particularly suitable carboxylic acids are oxalic acid, acetic acid, propionic acid, maleic acid, succinic acid, and especially formic acid.

The acid may be used in its concentrated form, e.g. 85 percent or even up to 98–100 percent, or may be used in solution, e.g. alcoholic solution. Thus, acetic acid, propionic acid, or oxalic acid may conveniently be employed as a 10 to 30 wt. percent solution in methanol or ethanol or methoxyethanol, but formic acid should preferably not be used in alcoholic solution for the one step method (hereinafter described).

Suitable surfactants include anionic, cationic, or non-ionic dispersants, the preferred dispersants being sulphonates, phenates, phosphorus sulphide-treated hydrocarbons, carboxylic acid, or metal soaps thereof.

Suitable sulphonates include natural and synthetic sulphonates, e.g. mahogany or petroleum alkyl sulphonates, or alkyl sulphonates or alkaryl sulphonates. The alkyl sulphonate should have at least 25 carbon atoms per molecule to be oil-soluble, whereas the alkaryl sulphonates need only at least 18 carbon atoms in the alkyl chain to be oil-soluble. The preferred molecular weight of the sulphonic acid radical is between 350 and 1,000, e.g. between 400 and 700. Instead of the sulphonate the corresponding sulphonic acid may be used.

The alkyl phenates or the alkyl phenols should have at least seven carbon atoms in an aliphatic chain to be oil-soluble. Examples are n-decyl phenol, cetyl phenol, nonyl phenol or the corresponding phenates, especially calcium alkyl phenates; or the corresponding phenol sulphides, e.g. nonyl phenol disulphide.

The phosphorus sulphide treated hydrocarbons are preferably phosphorus sulphide (e.g. $P_2S_5$) treated polyolefins, especially polyolefins having a molecular weight of between 500 and 1,500, e.g. those having a molecular weight of about 1,000. It is preferred that the phosphorus sulphide treated hydrocarbons be mixed with alkyl phenols or alkyl phenols and sulphonic acids.

Suitable carboxylic acids or metal soaps thereof are naphthenic acids and the higher fatty acids and metal soaps thereof. Suitable naphthenic acids include substituted cyclopentane mono and dicarboxylic acids having at least 15 carbon atoms for oil solubility, e.g. cetyl cyclohexane carboxylic acids. Suitable oil-soluble fatty acids include those containing at least eight carbon atoms, e.g. 2-ethyl hexoic acid, linoleic acid, chlorostearic acid or ricinoleic acid.

Suitable non-ionic surfactants include for example polyethylene glycol oleate, or polyoxethylene lauryl alcohol.

Suitable cationic surfactants include for example quaternary ammonium compounds of the formula $RR^1 - N - (CH_3)_2 Cl$ where R and $R^1$ are alkyl groups; polyalkenyl succinic anhydride/polyalkylene amine condensates or polyalkenyl carboxylic acid/polyalkylene amine condensates.

Also the surfactant can be a mixture of two or more of the above described surfactants. Thus, suitable surfactant mixtures are: sulphonate/alkyl phenol/phosphosulphurised hydrocarbon; or phosphosulphurised hydrocarbon/alkyl phenol.

The oil in which the surfactant is preferably dissolved can be for example a hydrocarbon, such as a paraffinic hydrocarbon or mineral oil. Alternatively the oil can be an aromatic diluent oil, e.g. phenol extract, benzene, toluene, xylene or alkyl-substituted naphthalenes; or white spirit.

It is preferable for the alcoholate to be added to the acid, e.g. dropwise, preferably while the latter is heated, e.g. to a temperature of between 60° and 200° C. The exact temperature will however depend on the boiling point of the acid, and for formic acid the desired maximum temperature is about 100° C. whereas for other acids it is higher. Alternatively, the acid may be added slowly, e.g. dropwise, to the alcoholate, preferably whilst the latter is heated to 150° to 240° C.

In preparing the additive by the preferred method of the invention, i.e. the one step method, and the only method which can be used for dicarboxylic acids or alcoholates derived from monovalent metals, the surfactant or mixture of surfactants is dissolved in oil and heated, e.g. to a temperature of between 60° to 100° C. The acid either not dissolved in alcohol or dissolved in an alcohol is added to the surfactant solution. The alcoholate is thereafter added, and volatile materials may be distilled off by heating to an elevated temperature, e.g. 180° to 220° C. and the reaction mixture thereafter cooled to a lower temperature. Three further additions of acid and alcoholate may then be added. When reacting the acid with alcoholate it is preferable that approximately 10 percent excess of acid over equivalent quantities of reactants be used. Thus one equivalent of an alcoholate (e.g. of a Group I, II or III metal) should be reacted with 0–10 percent excess over the equivalents of the carboxylic acid. Using this method better results are obtained by using 100 percent formic acid rather than formic acid dissolved in alcohol. Solid acids e.g. oxalic acid should be added as a solution in alcohol. This one-step method is preferred for formic and acetic acids.

The reaction between the acid and alcoholate of a polyvalent metal and alcoholate is believed to be as follows which illustrates the reaction between a calcium alcoholate and a monocarboxylic acid.

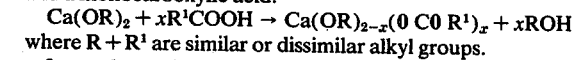

where $R + R^1$ are similar or dissimilar alkyl groups.

In an alternative method the alcoholate is partially reacted with the acid and the product thus obtained (i.e. the intermediate illustrated in the above equation as $Ca(OR)_{2-x}(OCO$ R$^1$)$_x$) is added to the surfactant dissolved in the diluent, and further acid is then added so as to form the metal salt of the acid, which usually forms as a colloidal dispersion in the diluent.

Thus, this further reaction of the intermediate is believed to be as follows, illustrating the reaction of a calcium alcoholate/monocarboxylate with further monocarboxylic acid $$Ca(OR)_{2-x}(O\,CO\,R^1)_x + (2-x)\,R^1COOH \rightarrow Ca(O\,CO\,R^1)_2 + (2-x)ROH$$

In this method where an intermediate is first formed it is essential that a monocarboxylic acid and not a dicarboxylic acid is used and that formic or acetic acids be added as an alcoholic solution. When forming an intermediate it is preferable if about one-half equivalents or less of the acid be reacted with the alcoholate in the first step, followed by addition of one-half equivalent or more in the second step.

The additives of this invention are highly basic and often Total Base Numbers (TBN) of 300 or more can be obtained.

The additive of this invention can be added to a lubricating oil, preferably as a minor proportion by weight, e.g. between 0.01 and 10 percent by weight (especially between 0.1 and 5 percent by weight) or even up to 30 weight percent especially for example for marine cylinder lubricants.

Suitable lubricating oils include animal, vegetable or mineral oils, for example petroleum oil fractions ranging from spindle oil to SAE 30, 40 or 50 lubricating oil grades; castor oil, fish oils, oxidised mineral oil or brightstocks. Synthetic esters may also be used, e.g. diester such as those prepared by esterifying carboxylic acids such as adipic or sebacic acid with monohydric alcohols; or complex esters obtained by the esterification of a polyhydric alcohol (e.g. a polyglycol) with a dibasic acid (e.g. sebacic acid or adipic acid) and a monohydric alcohol (e.g. 2-ethyl-hexanol or a C$_8$oxo Alcohol).

The additive of the invention can also be added to a fuel, e.g. a kerosene gas oil, distillate fuel such as a diesel fuel, or a gasoline.

EXAMPLE I 2-methoxy ethanol (2,250 g.) was refluxed for 24 hours with calcium metal borings (250 g.) and filtered to give 2,176 g. of calcium alcoholate solution (calcium content 8.28 wt. percent). The following ingredients were charged to a flask and heated to 80° C.

| | g. |
|---|---|
| Calcium sulphonate (45% active ingredient) | 336 |
| Phosphosulphurised polybutene of MW 900 | 114.9 |
| Nonyl phenol | 45.9 |
| Mineral oil | 103.2 |

Formic acid (98–100 percent) (61 g.) was then followed by 285 g. of the calcium alcoholate solution. Volatile materials were distilled off by heating to 200° C. and the reaction mixture then cooled to 80° C. Three further stages of formic acid and alcoholate addition at 80° C. and heating to 200° C. were then carried out. In each of these three stages, 285 g. of calcium alcoholate solution and 52 g. of formic acid were used. The total amount of calcium alcoholate solution was therefore 1,140 g. and the total amount of formic acid was 217 g.

The product was clear, and filtered readily. The filtered product had a calcium content of 11.71 wt. percent and a TBN of 309 mg. KOH/g.

EXAMPLE 2

Calcium sulphonate (45 percent active ingredient) was charged to a flask and heated to 200° C. Calcium methoxyethanolate solution in methoxyethanol (containing total of 20 g. calcium as alcoholate) was then added dropwise such that the solvent alcohol was continuously distilled from the alcoholate/ sulphonate mixture. Formic acid (69 g.) in methoxyethanol (140 g.) was then added over 3 hours, and the mixture then sparged with nitrogen for 20 minutes. The filtered product had a calcium content of 9.73 wt. percent and a TBN of 238 KOH/g.

EXAMPLE 3

Formic acid (43.5 g.) added as a 20 percent solution in methoxyethanol to calcium alcoholate solution (containing total of 58.5 g. calcium as methoxyethanolate) to give a clear stable solution referred to as the "intermediate."

Calcium sulphonate (45 percent active ingredient) was charged to a flask and heated to 80° C. Formic acid (20 g.) was then added, followed by 150 g. of the "intermediate" solution. Volatile materials were distilled off by heating to 200° C., and the reaction mixture then cooled to 80° C. Three further stages of formic acid and "intermediate" addition at 80° C. and heating 200° C. were then carried out. In each of these three stages, 16.0 g. of formic acid and 150 g. of "intermediate" solution were used.

EXAMPLE 4

The following ingredients were charged to a flask, and heated to 80° C.

| | g. |
|---|---|
| Calcium sulphonate (45% active ingredient) | 448 |
| Phosphosulphurised polybutene of MW 900 | 153.3 |
| Nonyl phenol | 61.2 |
| Mineral oil | 137.6 |

A solution of oxalic acid (38.3 g.) in methoxyethanol (153 g.) was then added, followed by calcium alcoholate solution (containing 14.2 g. calcium as methoxyethanolate). Volatile materials were distilled off by heating to 200° C., and the reaction mixture then cooled to 80° C. This procedure of oxalic acid and alcoholate addition followed by heating was repeated three further times using the same quantities of reagents.

The filtered product had a calcium content of 7.5 wt. percent.

EXAMPLE 5

The following ingredients were charged to a flask and heated to 80° C.

| | g. |
|---|---|
| Synthetic alkylbenzene sulphonic acid (approx. 75% active ingredient) | 100 |
| Mineral oil | 100 |

Calcium alcoholate solution (containing 4.2 g. calcium as methoxyethanolate) was then added and the reaction mixture heated to 140° C. Formic acid (9.6 g.) in methoxyethanol (40 g.) was then added. Volatile materials were removed by heating to 200° C., and the reaction mixture then cooled to 80° C. This procedure of alcoholate and acid addition, and heating was then repeated three further times using the same quantities of reagents.

The filtered product had a calcium content of 5.6 wt. percent and a TBN of 127 mg. KOH/g.

We claim:

1. A process for preparing a detergent additive for an oil composition which comprises reacting a polyvalent metal alcoholate with a monobasic or dibasic carboxylic acid of from one to four carbon atoms in the presence of a liquid hydrocarbon diluent and a surfactant, said metal alcoholate being that of a monohydric aliphatic alcohol of less than eight carbon atoms or of a monohydric alkoxy alkanol of less than eight carbon atoms.

2. A process as defined by claim 1 wherein said surfactant is a hydrocarbon sulfonic acid of from about 350 to 1,000 molecular weight.

3. A process as defined by claim 1 wherein said surfactant is a metal salt of a hydrocarbon sulfonic acid of from about 350 to 1,000 molecular weight.

4. A process as defined by claim 1 wherein said surfactant is a phosphorus-sulfide-treated olefin polymer.

5. A process as defined by claim 1 wherein said reaction is conducted by heating said acid to a temperature between 60° and 200° C. and slowly adding the alcoholate to the acid.

6. A process as defined by claim 1 wherein said alcoholate is heated to a temperature between 150° and 240° C. and the acid is added slowly to the alcoholate.

7. A process as defined by claim 1 wherein the proportion of acid to alcoholate is from 0 to 10 percent in excess of the amount theoretically required to convert metal alcoholate to metal carboxylate.

8. A process as defined by claim 1 wherein said surfactant is a calcium hydrocarbon sulfonate.

9. A process as defined by claim 1 wherein said metal alcoholate is an alkaline earth metal alcoholate.

10. A process as defined by claim 1 wherein said alcoholate is calcium methoxyethanolate.

11. A detergent additive prepared by the process of claim 1.

12. A detergent additive as defined by claim 11 wherein said acid is formic acid.

13. A detergent additive as defined by claim 11 wherein said metal is calcium.

14. A lubricating oil containing 0.01 to 30 percent by weight of the additive claimed in claim 11.

* * * * *